UNITED STATES PATENT OFFICE.

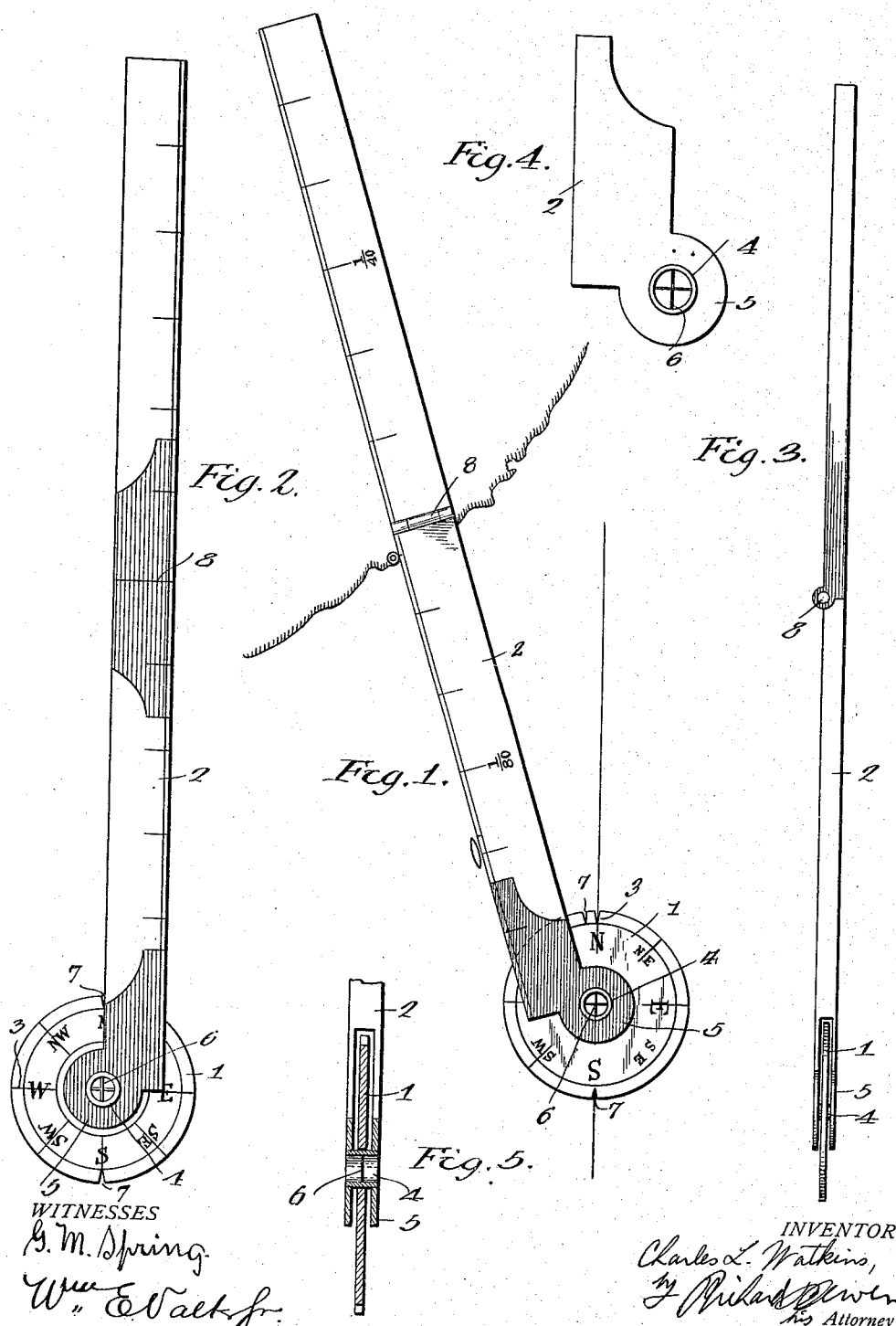

CHARLES L. WATKINS, OF ROCK HALL, MARYLAND.

MEASURING INSTRUMENT.

1,166,501.    Specification of Letters Patent.    Patented Jan. 4, 1916.

Application filed January 25, 1913. Serial No. 744,121.

*To all whom it may concern:*

Be it known that I, CHARLES L. WATKINS, a citizen of the United States, residing at Rock Hall, in the county of Kent and State of Maryland, have invented new and useful Improvements in Measuring Instruments, of which the following is a specification.

My present invention relates broadly to measuring instruments and has particular reference to that class of devices whereby the distance of a ship from any known geographical point may be ascertained.

A further object of the invention contemplates the provision of such means as will make it possible to readily ascertain plotted distances on marine charts.

Heretofore it has been necessary in determining the distance of a ship from a known geographical point to the port of destination to use or employ a pair of dividers. By operating the dividers and placing one point upon the spot indicating the present location upon the ship and the other point upon the port of destination indicated on the chart and moving the dividers over to the "scale" provided in connection with the chart, the distance to be traveled can be ascertained. This operation quite often proves inaccurate owing to the fact that the dividers either slightly close or open during their movement from one place to another, which slight variation renders the distance determined inaccurate. In determining the direction of travel a pair of parallel rules is employed, which operation is also ineffective and often inaccurate by reason of the possibility of the rules moving or widening when slid or moved upon the chart, and it is to overcome the above and various other objectionable features that the present invention has been designed.

With the above and various other objects in view, my invention relates to such details of construction and arrangement and combination of the several parts as will be hereinafter fully described and specifically pointed out in the appended claim.

In describing my invention in detail reference will be had to the accompanying drawings wherein like characters denote like or corresponding parts throughout the several views, and in which:—

Figure 1 is a plan view of the device. Fig. 2 is a similar view looking at the reverse side. Fig. 3 is an edge view. Fig. 4 is an enlarged detail view, and Fig. 5 is an enlarged sectional view of the disk and its supporting means.

Before proceeding with the description of the drawings I wish to call particular attention to the fact that while I have evolved my invention with particular references to the ascertaining of plotted distances on marine or nautical charts, it may be readily utilized in connection with plane tables or similar instruments.

The preferred embodiment of my invention comprehends two main elements, a protractor disk and a graduated protractor arm, indicated in the drawings by the numerals 1 and 2 respectively. The disk 1 is preferably made of metal and provided with radially extending graduation marks 3. These marks are lettered in a manner similar to the radial marks of a compass. The disk is centrally perforated to receive a pivot pin 4 which is journaled therein and projects laterally from each face of the disk. The protractor arm or rule 2 is pivoted centrally of the disk by means of the offset ears 5 which are centrally perforated and mounted for rotation on the pivot pin 4. One of the parallel edges of the protractor arm 2 is provided with a plurality of graduated marks, and the opposite edge is disposed in such relation to the disk 1 as to extend radially from the axis of rotation thereof, the purpose of which will be hereinafter fully disclosed. The pivot pin above mentioned is preferably tubular in construction, the interior of which is provided with a pair of transversely extending wires 6, the intersection of which indicates the exact center of the disk. The periphery of the disk is provided with a series or plurality of notches 7, indicating the variation or degree of deviation from the meridian line running from the north to the south magnetic pole.

As regards the method of utilizing my device to ascertain the direction of travel as well as the distance to be traveled before reaching the port of destination the device is first place upon either the meridian line or nearest latitude line upon the chart, to the present location of the ship. When thus placed, and with the "north" and "south" graduating marks directly in the line of the meridian, said disk is slid or moved longitudinally upon said line until the graduated edge of the protractor arm is in alinement with the point indicating the present location of the ship and the port of destination, in which event the distance to be traveled can be readily ascertained, as the graduation marks upon the said protractor arm are such as to conform exactly with the scale of the chart to which it is applied. The said arm is preferably composed of two sections hingedly connected as at 8, each section being provided with the necessary graduation marks. Having determined the distance to be traveled, the direction of travel is quickly determined by the position of the protractor arm relative to the disk. The opposite edge of the protractor arm being parallel with the graduated edge, and in perfect alinement or in radial relation with the center of the disk, the direction to be traveled will be indicated upon the said disk as is clearly illustrated in Fig. 1 of the drawings.

It will be seen from the foregoing taken in connection with the accompanying drawings that the construction and operation of the device is simple in the extreme, that the objectionable features attending devices employed for this purpose at present are completely avoided and that time and calculation are eliminated to a great extent in the practical application of the invention.

It is thought from the foregoing that the advantages and novel features of my invention will be readily comprehended.

I desire it to be understood that I may make slight changes in the construction and in the arrangement and combination of the several parts, provided such changes fall within the scope of the subjoined claim.

Having thus fully described my invention, what I claim as new and desire to secure by Letters Patent, is:—

A device to be used in connection with marine charts for finding the course and distance to be traveled by a vessel at sea consisting of a graduated protractor disk having an opening at its center, a tubular member fitting the opening to act as a sight tube and a pivot pin, a movable sectional protractor arm bifurcated at one end to straddle the disk, the respective arm extensions formed by the bifurcation aforesaid being laterally offset and engageable with the respective tubular member terminals to dispose one edge of said arm radially relatively to the center of the disk, and means within the tubular member to indicate the exact center of said disk, as and for the purpose set forth.

CHARLES L. WATKINS.

Witnesses:
HARRY CLARK,
FRANK B. WHEAT.

Copies of this patent may be obtained for five cents each, by addressing the "Commissioner of Patents, Washington, D. C."